US009976857B2

(12) United States Patent
Hong et al.

(10) Patent No.: US 9,976,857 B2
(45) Date of Patent: May 22, 2018

(54) APPARATUS FOR PROVIDING AN AZIMUTH ANGLE

(71) Applicant: MICROINFINITY, CO., LTD., Suwon-si (KR)

(72) Inventors: Jin Seok Hong, Seoul (KR); Chul Bum Kwon, Suwon-si (KR); Woo-Hee Yang, Anyang-si (KR)

(73) Assignee: MICROINFINITY CO., LTD., Suwon-Si (KR)

( * ) Notice: Subject to any disclaimer, the term of this patent is extended or adjusted under 35 U.S.C. 154(b) by 128 days.

(21) Appl. No.: 14/952,671

(22) Filed: Nov. 25, 2015

(65) Prior Publication Data

US 2016/0076889 A1 Mar. 17, 2016

Related U.S. Application Data

(63) Continuation of application No. PCT/KR2014/002707, filed on Mar. 31, 2014.

(30) Foreign Application Priority Data

May 27, 2013 (KR) ........................ 10-2013-0059680

(51) Int. Cl.
*G01C 19/00* (2013.01)
*G01P 3/44* (2006.01)
*G01P 15/08* (2006.01)
*G01C 19/38* (2006.01)

(52) U.S. Cl.
CPC .................................... *G01C 19/38* (2013.01)

(58) Field of Classification Search
CPC ....... G01C 19/38; G01C 19/02; G01C 19/065
USPC ........................ 73/504.08; 701/500
See application file for complete search history.

(56) References Cited

U.S. PATENT DOCUMENTS 4,559,713 A * 12/1985 Ott ...................... E21B 47/022
33/302

FOREIGN PATENT DOCUMENTS

| JP | 08-043103 A | 2/1996 |
| JP | 2000-142581 A | 5/2000 |
| JP | 4890660 B2 | 3/2012 |

OTHER PUBLICATIONS

Korean Intellectual Property Office, International Search Report, International Application No. PCT/KR2014/002707, Jul. 7, 2014, 2 pages.

* cited by examiner

*Primary Examiner* — Walter L Lindsay, Jr.
*Assistant Examiner* — Ruth Labombard
(74) *Attorney, Agent, or Firm* — Perkins Coie LLP

(57) ABSTRACT

The present invention relates to an apparatus for providing an azimuth angle, i.e., an apparatus for calculating an azimuth angle using an angular rate sensed by a gyro sensor, which has rotated by an arbitrary angle, and an angle of rotation. The apparatus for providing an azimuth angle in accordance with one embodiment of the present invention may comprise a rotating member, an angular rate sensor mounted on the rotating member, and a driving unit configured to rotate the rotating member by a first angle. The angular rate sensor may be configured to sense an angular rate of the rotating member. The apparatus may further comprise an azimuth angle estimation unit configured to estimate an azimuth angle of the apparatus based on the sensed angular rate and the first angle.

14 Claims, 9 Drawing Sheets

Fig. 6

$$\begin{bmatrix} \omega_X \\ \omega_Y \\ \omega_Z \end{bmatrix}_{600} = \begin{bmatrix} \cos\psi & \sin\psi & 0 \\ -\sin\psi & \cos\psi & 0 \\ 0 & 0 & 1 \end{bmatrix}_{500} \begin{bmatrix} \Omega\cos l \\ 0 \\ -\Omega\sin l \end{bmatrix}_{400}$$

$$= \begin{bmatrix} \Omega\cos l \cos\psi & \quad \sim 610 \\ -\Omega\cos l \sin\psi & \quad \sim 620 \\ -\Omega\sin l & \quad \sim 630 \end{bmatrix}$$

$\omega_X$ : Gyroscope measurement
$\Omega$ : Angular velocity of earth's rotation
$L$ : Latitude
$\psi$ : Azimuth angle
$b$ : Sensor error

APPARATUS FOR PROVIDING AN AZIMUTH ANGLE

CROSS-REFERENCE TO RELATED APPLICATIONS

Under 35 U.S.C. § 120, this patent document is a continuation of, and claims the benefits and priority to, International Application No. PCT/KR2014/002707, filed on Mar. 31, 2014, which further claims priority of and benefits to Korean Patent Application No. 10-2013-0059680, filed on Mar. 27, 2013, the entire contents of which are hereby incorporated by reference.

TECHNICAL FIELD

The disclosed technology relates to an apparatus for measuring rotation, including measuring an azimuth angle of a rotation.

BACKGROUND

Various apparatuses have been suggested for providing an azimuth angle. An azimuth angle refers to an angle as measured with respect to the true north or magnetic north. The azimuth angle may be calculated using a compass, a terrestrial magnetic sensor, or a Global Positioning System (GPS). The compass and terrestrial magnetic sensor utilize the earth's magnetic force and the GPS uses GPS signals received from the GPS satellites to find out the observer's direction of movement and azimuth angle.

SUMMARY

The disclosed technology provides various implementations to compute an azimuth angle based on an angular rate sensed by a gyro sensor, which has rotated by an arbitrary angle, and the arbitrary angle.

In one aspect, an apparatus for providing an azimuth angle is provided to comprise an angular rate sensor configured to sense an angular rate applied to a main body; a driver configured to rotate the angular rate sensor by a an arbitrary angle; and an azimuth angle estimation unit configured to estimate an azimuth angle of the angular rate sensor based on the sensed angular rate and the arbitrary angle.

In some implementations, the azimuth angle estimation unit is further configured to estimate the azimuth angle of the angular rate sensor based on at least one of an X-axis component and a Y-axis component of the sensed angular rate and the predetermined angle. In some implementations, the azimuth angle estimation unit is further configured to estimate the azimuth angle of the angular rate sensor based on said one of the X-axis component and the Y-axis component of the sensed angular rate, the predetermined angle, a latitude of the main body, and the angular velocity of the earth's rotation. In some implementations, the azimuth angle estimation unit is further configured to estimate the azimuth angle of the angular rate sensor based on a difference between an angular rate sensed before the angular rate sensor rotates and an angular rate sensed after the angular rate sensor rotates. In some implementations, the angular rate sensed after the angular rate sensor rotates is one of an angular rate sensed when the angular rate sensor is stationary and an angular rate sensed while the angular rate sensor is rotating. In some implementations, the azimuth angle estimation unit is further configured to estimate the azimuth angle of the angular rate sensor based on an average of at least two sensed angular rates or the Kalman filtering technique. In some implementations, the angular rate sensor comprises at least two sub-sensors, each sensing an angular rate about a different axis. In some implementations, the azimuth angle estimation unit is further configured to estimate the azimuth angle of the angular rate sensor with reference to an angle the main body makes with the ground level. In some implementations, the azimuth angle estimation unit is further configured to estimate the azimuth angle of the angular rate sensor based on a first mathematical equation and a second mathematical equation, said first equation being expressed in terms of the sensed angular rate, the angular velocity of the earth's rotation, a latitude of the main body, an azimuth angle in a state before the angular rate sensor is firstly subject to rotational motion, and a first error in an output of the angular rate sensor, and said second mathematical equation being expressed in terms of the sensed angular rate, the angular velocity of the earth's rotation, the latitude of the main body, an azimuth angle in a state after the angular rate sensor is firstly subject to rotational motion, and the first error in the output of the angular rate sensor, wherein the azimuth angle in the state before the angular rate sensor is firstly subject to rotational motion, the azimuth angle in the state after the angular rate sensor is firstly subject to rotational motion, and the first error in the output of the angular rate sensor are unknown. In some implementations, the azimuth angle estimation unit is further configured to estimate the azimuth angle of the angular rate sensor by applying a third mathematical equation derived from further rotation of the angular rate sensor to the first and second mathematical equations, if the latitude of the angular rate sensor is unknown, and wherein the third mathematical equation is expressed in terms of the sensed angular rate, the angular velocity of the earth's rotation, the latitude of the main body, an azimuth angle in a state after the angular rate sensor is secondly subject to rotational motion, and a second error in the output of the angular rate sensor. In some implementations, the first or second error includes at least one of a scale factor and a drift bias.

In another aspect, an apparatus for providing an azimuth angle is provided to comprise: an angular rate sensor configured to sense an angular rate applied to a main body; an angle sensor configured to sense an angle by which the angular rate sensor is rotated; and an azimuth angle estimation unit configured to estimate an azimuth angle of the angular rate sensor based on the sensed angular rate and the sensed angle.

In some implementations, the azimuth angle estimation unit is further configured to estimate the azimuth angle of the angular rate sensor based on at least one of an X-axis component and a Y-axis component of the sensed angular rate and the sensed angle. In some implementations, the azimuth angle estimation unit is further configured to estimate the azimuth angle of the angular rate sensor based on said one of the X-axis component and the Y-axis component of the sensed angular rate, the sensed angle, an latitude of the main body, and the angular velocity of the earth's rotation. In some implementations, the azimuth angle estimation unit is further configured to estimate the azimuth angle of the angular rate sensor based on a difference between an angular rate sensed before the angular rate sensor rotates and an angular rate sensed after the angular rate sensor rotates. In some implementations, the angular rate sensed after the angular rate sensor rotates is one of an angular rate sensed when the angular rate sensor is stationary and an angular rate sensed while the angular rate sensor is rotating. In some implementations, the azimuth angle estimation unit is further configured to estimate the azimuth angle of the angular rate sensor based on an average of at least two sensed angular rates or the Kalman filtering technique. In some implementations, the angular rate sensor comprises at least two sub-sensors, each sensing an angular rate about a different axis. In some implementations, the azimuth angle estimation unit is further configured to estimate the azimuth angle of the angular rate sensor with reference to an angle the main body makes with the ground level. In some implementations, the azimuth angle estimation unit is further configured to estimate the azimuth angle of the angular rate sensor based on a first mathematical equation and a second mathematical equation, said first equation being expressed in terms of the sensed angular rate, the angular velocity of the earth's rotation, an latitude of the main body, an azimuth angle in a state before the angular rate sensor is firstly subject to rotational motion, and a first error in an output of the angular rate sensor, and said second mathematical equation being expressed in terms of the sensed angular rate, the angular velocity of the earth's rotation, the latitude of the main body, an azimuth angle in a state after the angular rate sensor is firstly subject to rotational motion, and the first error in the output of the angular rate sensor, wherein the azimuth angle in the state before the angular rate sensor is firstly subject to rotational motion, the azimuth angle in the state after the angular rate sensor is firstly subject to rotational motion, and the first error in the output of the angular rate sensor are unknown. In some implementations, the azimuth angle estimation unit is further configured to estimate the azimuth angle of the angular rate sensor by applying a third mathematical equation and a fourth mathematical equation derived from further rotation of the angular rate sensor to the first and second mathematical equations, if the latitude of the angular rate sensor is unknown, and wherein the third mathematical equation is expressed in terms of the sensed angular rate, the angular velocity of the earth's rotation, the latitude of the main body, an azimuth angle in a state before the angular rate sensor is secondly subject to rotational motion, and a second error in the output of the angular rate sensor, and the fourth mathematical equation is expressed in terms of the sensed angular rate, the angular velocity of the earth's rotation, the latitude of the main body, an azimuth angle in a state after the angular rate sensor is secondly subject to rotational motion, and a second error in the output of the angular rate sensor. In some implementations, the first or second error includes at least one of a scale factor and a drift bias.

In one aspect, an apparatus is provided to comprise: a rotatable member; a driver configured to cause a rotation of the rotatable member by a first angle; an angular rate sensor engaged to the rotatable member and configured to sense an angular rate of the rotatable member; and an azimuth angle estimation unit configured to receive information on the sensed angular rate of the rotatable member and estimate an azimuth angle of the rotatable member based on the sensed angular rate and the first angle.

In some implementations, the first angle is predetermined. In some implementations, the first angle is arbitrary, and the apparatus further comprises an angle sensor configured to sense the first angle. In some implementations, the angular rate sensor is configured and operated to make measurements of the angular rate to include a first angular rate of the rotatable member sensed before the rotatable member is rotated and a second angular rate of the rotatable member sensed after the rotatable member is rotated. In some implementations, the azimuth angle estimation unit is further configured to estimate the azimuth angle of the rotatable member based on a difference between the first and second angular rates. In some implementations, the angular rate sensor operates to measure the second angular rate when the angular rate sensor is stationary after the rotation or while the angular rate sensor is rotating. In some implementations, the angular rate sensor is configured and operated to make measurements of the angular rate at least twice, and the azimuth angle estimation unit is further configured to estimate the azimuth angle of the rotatable member based on an average of the sensed angular rates. In some implementations, the angular rate sensor comprises at least two sensors, each sensing a different axis component of the angular rate of the rotatable member. In some implementations, the azimuth angle estimation unit is further configured to estimate the azimuth angle of the rotatable member with reference to an attitude of the rotatable member. In some implementations, the azimuth angle estimation unit is further configured to estimate the azimuth angle of the rotatable member based on the first angle, the first and second angular rates, the angular velocity of the earth's rotation, and a latitude of the rotatable member. In some implementations, the driver is further configured to cause an additional rotation of the rotatable member by a second angle; the angular rate sensor is configured and operated to make further measurements of the angular rate to include a third angular rate of the rotatable member sensed after the additional rotation of the rotatable member; and the azimuth angle estimation unit is further configured to estimate the azimuth angle of the rotatable member based on the first and second angles, the first, second, and third angular rates, and the angular velocity of the earth's rotation. In some implementation, the azimuth angle estimation unit is further configured to produce a recursive filter estimation of the azimuth angle of the rotatable member based on the first angle, the first and second angular rates, the angular velocity of the earth's rotation, and the latitude of the rotatable member. In some implementations, the azimuth angle estimation unit is further configured to produce a recursive filter estimation of the azimuth angle of the rotatable member based on the first and second angles, the first, second, and third angular rates, and the angular velocity of the earth's rotation.

In another aspect, an apparatus is provided to comprise: an angular rate sensor; a drive mechanism configured to rotate the angular rate sensor, wherein the angular rate sensor is configured to sense an angular rate of the angular rate sensor rotated by the drive mechanism; and an azimuth angle estimation unit configured to estimate an azimuth angle of the angular rate sensor based on the sensed angular rate from the angular rate sensor, an angle by which the angular rate sensor is rotated, and an angular velocity of the earth's rotation.

In some implementations, the apparatus further comprises an angle sensor configured to sense the angle. In some implementations, the drive mechanism comprises a rotatable member engaged to the angular rate sensor to cause the angular rate sensor to rotate together with the rotatable member.

In another aspect, an apparatus is provided to comprise: an angular rate sensor; a drive mechanism configured to rotate the angular rate sensor by a predetermined angle, wherein the angular rate sensor is configured to sense an angular rate of the angular rate sensor rotated by the driving mechanism; and an azimuth angle estimation unit configured to estimate an azimuth angle of the angular rate sensor based on the sensed angular rate from the angular rate sensor, the predetermined angle, and an angular velocity of the earth's rotation. In some implementations, the drive mechanism comprises a rotatable member engaged to the angular rate sensor to cause the angular rate sensor to rotate together with the rotatable member.

The further details of other embodiments will be apparent from the detailed descriptions given below and drawings.

Some implementations of the disclosed technology provide a mechanism for measuring an azimuth angle in a stationary status without being affected by the magnetic force in the surroundings by means of estimating the azimuth angle using an angular rate sensed by a gyro sensor, which has rotated by an arbitrary angle, and the arbitrary angle.

Further, some implementations of the disclosed technology allow a azimuth measuring apparatus to be implemented in a cost-effective way since the apparatus is able to compute an azimuth angle using a gyro sensor of low efficiency.

BRIEF DESCRIPTION OF DRAWINGS

FIG. 6 is a view showing a combination of an angular rate measured in a particular latitude in FIG. 4 and an attitude of a rotating table shown in FIG. 5.

DETAILED DESCRIPTION

Figure 1:
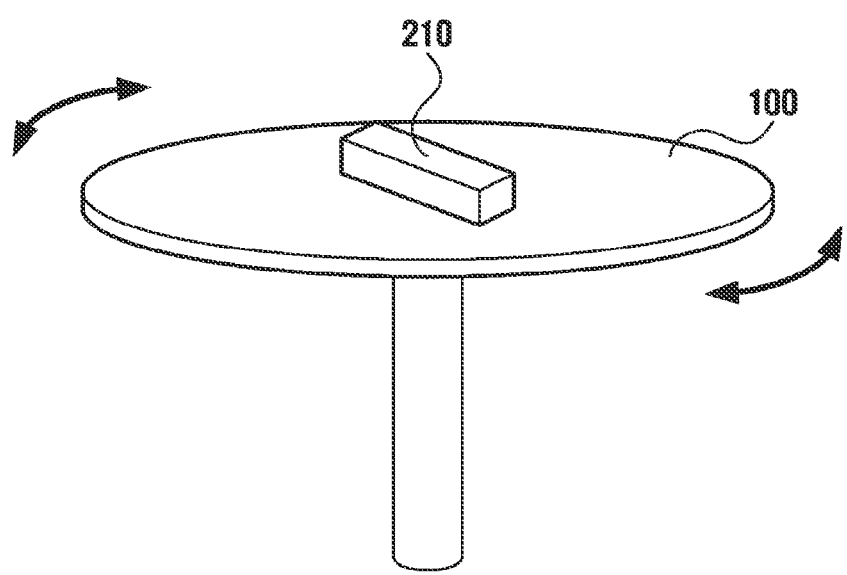
FIG. 1 is a view illustrating an angler rate sensor rotating according to one embodiment of the disclosed technology.

As discussed above, the azimuth angle can be calculated using a compass, a terrestrial magnetic sensor, or a Global Positioning System (GPS). Since the compass and terrestrial magnetic sensor utilize the earth's magnetic force, if there exists any object generating a magnetic force in the vicinity of the compass or terrestrial magnetic sensor, the reliability on calculated angle decreases. For the GPS signals, it is difficult, or not possible in some circumstances, to find out the observer's direction of movement and azimuth angle if the observer is not in motion. This is because the GPS method requires using the GPS signals received with time differences while the observer is moving. Therefore, there is a need for an apparatus that can measure an azimuth angle in a stationary status without being affected by the magnetic force in the surroundings.

In this patent document, various examples and implementations are discussed to provide an apparatus for providing an azimuth angle. Reference will now be made in detail to the embodiments, examples of which are illustrated in the accompanying drawings. The features and advantages of the disclosed technology will become more apparent by referring to the embodiments thereof given in conjunction with the attached drawings. However, the disclosed technology is not limited to the embodiments described below but may be materialized in various different ways. The reference numerals refer to the like elements throughout.

As used herein, all terminologies (including technical and scientific terms) may be defined by the definition commonly shared by those skilled in the art to which the invention pertains unless a different definition is provided. Also, general terms and phrases whose definitions are provided in a common dictionary are not to be interpreted out of the common understanding unless an otherwise definition is explicitly provided.

FIG. 1 is a view illustrating an angler rate sensor rotating according to one embodiment of the disclosed technology.

An angular rate sensor 210 is equipped in a main body 100 by attaching or engaging the angular rate sensor 210 to the main body 100 in a way such that the angular rate sensor 210 and the main body 100 move together. The angular rate sensor rotates along with the main body 100 and senses the angular rate generated by the movement of the main body 100. The angular rate sensed by the angular rate sensor 210 includes not only the angular rate generated by the main body but also the angular rate components of the earth's rotation.

In other words, even when the main body is stationary, the angular rate sensor 210 is sensing the angular velocity of the earth's rotation.

In this case, the sensed angular velocity of the earth's rotation (earth rate) varies according to the latitude and the position of the angular rate sensor 210. With the use of the sensed angular velocity of the earth's rotation, the direction, to which the angular rate sensor 210 is oriented, i.e., the azimuth angle of the main body may be measured.

In order to sense the angular velocity of the earth's rotation, an angular rate sensor needs to have high accuracy. The use of such accurate angular rate sensor in estimating the azimuth angle will incur excessive costs.

According to one embodiment of the disclosed technology, the apparatus for providing an azimuth angle 200 is configured to compensate for errors included in the sensed output of the angular rate sensor 210. As shown in FIG. 1, in the apparatus, an angular rate sensor 210 is placed on a rotating table 100 to eliminate the errors by combining an angular rate sensed by the angular rate sensor 210 and an angle of rotation of the rotating table 100.

More detailed descriptions of the error elimination process will later be explained in conjunction with FIGS. 7 and 8.

Figure 2:
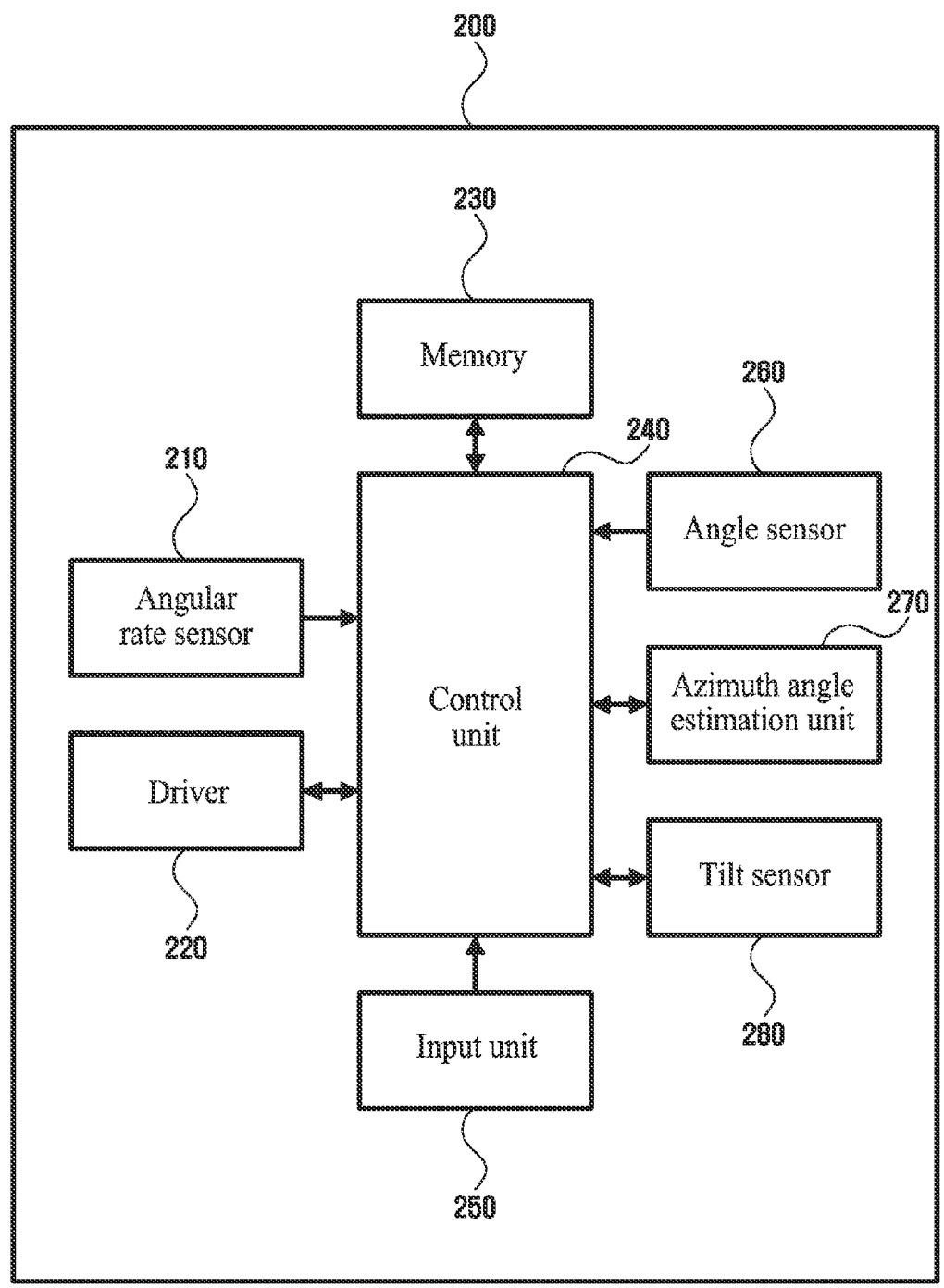
FIG. 2 is a block diagram showing an apparatus for providing an azimuth angle according to one embodiment of the disclosed technology.

FIG. 2 is a block diagram showing an apparatus for providing an azimuth angle according to one embodiment of the disclosed technology. The apparatus 200 for providing an azimuth angle 200 may comprise an angular rate sensor 210, a driving unit 220, a memory 230, a control unit 240, an input unit 250, an angle sensor 260, an azimuth angle estimation unit 270, and a tilt sensor 280.

The angular rate sensor 210 operates to compute an angular rate applied to the main body. As the main body rotates, an angular rate is generated. The angular rate sensor 210 may be configured to sense the angular rate generated.

Meanwhile, as noted above, even when the main body 100 itself is in a stationary state with respective to a reference such as the earth, the main body 100 is deemed to be in a rotating condition due to the rotation of the earth.

Therefore, it is understood that the angular rate sensed by the angular rate sensor 210 contains the angular rate components of the earth's rotation.

The driving unit 220 may function to rotate the angular rate sensor 210 by an arbitrary angle. To this end, the driving unit 220 may comprise a rotating table 100, on which the angular rate sensor 210 is mounted. However, a member, on which the angular rate sensor 210 is mounted, is not limited to the rotating table 100, but may comprise various means that make the angular rate sensor 201 rotate.

The angle of rotation to be effected by the driving unit 220 may be predetermined. For example, if the angle is predetermined to be 30°, the driving unit 220 will rotate the angular rate sensor 210 by 30°.

Therefore, the driving unit 220 may be designed to comprise a means to achieve rotation of the angular rate sensor 201 by a specified angle.

The memory 230 may store a value corresponding to the predetermined angle. The driving unit 220 may retrieve the value corresponding to the predetermined angle stored in the memory 230 and apply a rotation corresponding to the retrieved value to the angular rate sensor 210. Furthermore, the memory 230 may store latitude information, which may be provided by the input unit 250.

Also, the memory 230 may temporarily or permanently store the estimated results provided by the angular rate sensor 210, the angle sensor 260 and the azimuth angle estimation unit 270.

In some implementations, the apparatus 200 further includes an angle sensor 206. The angle sensor 260 may sense a degree of angle by which the angular rate sensor 210 is rotated. If the predetermined angle is not stored in the memory 230, the driving unit is not designed to rotate by an arbitrary angle, or the driving unit (220) is not equipped in the apparatus for providing an azimuth angle 200, the apparatus may be equipped with the angle sensor 260 in order to sense the angle of rotation of the angular rate sensor 210.

Therefore, the apparatus for providing an azimuth angle 200 may comprise the driving unit 220 and/or the angle sensor 260.

The input unit 250 may receive a user command. The user command may comprise at least one of the following: a predetermined angle input command; a latitude input command; a start command for the angle sensor 260; and a start command for the azimuth angle estimation unit 270.

The predetermined angle input command may include the predetermined angle described above. As mentioned above, it may be used by the driving unit 220 and stored in the memory 230.

The latitude input command may include a latitude. The user may input latitude information on the current position where he is located via the input unit 250. However, in case that a means for determining latitude, such as a GPS receiver, is included in the apparatus for providing an azimuth angle 200, the user needs not input latitude information.

The start command for the angle sensor 260 may command the angle sensor 260 to compute an angle of rotation of the angular rate sensor 210. The angle sensor 260 will remain in a stationary state until the start command is given. Upon receiving the start command, the angle sensor 260 starts to sense an angle of rotation of the angular rate sensor 210.

In some implementations, the user may first give the start command for the angle sensor 260 and then make motion applied to the main body to rotate the angular rate sensor 210 so that the angle sensor 260 can sense the angle of rotation.

The start command for the azimuth angle estimation unit 270 may command the azimuth angle estimation unit 270 to compute the azimuth angle. The azimuth angle estimation unit 270 may remain in a standby state until the start command is given. Upon receiving the start command, the azimuth angle estimation unit 270 may perform the necessary operations to compute the azimuth angle.

For example, the azimuth angle estimation unit 270 may use data provided by the angular rate sensor 210, the memory 230, the driving unit 220, and the angle sensor 260 to compute the azimuth angle.

Furthermore, after the start command has been given, the azimuth angle estimation unit 270 may issue control command to the angular rate sensor 210. The angular rate sensor 210 may then sense the angular rate at the time when it receives the control command and send the sensed angular rate to the azimuth angle estimation unit 270.

Also, after the start command has been given, the azimuth angle estimation unit 270 may issue control command to the driving unit 220. The driving unit 220 may then make the angular rate sensor 210 rotated at the time when it receives the control command. In this case, the azimuth angle estimation unit 270 may retrieve the value corresponding to the predetermined angle from the memory 230 to compute the azimuth angle.

Alternatively, if a value corresponding to the predetermined angle is not stored in the memory 230 or the apparatus does not have a driving unit, the azimuth angle estimation unit 270 may compute the azimuth angle using the angle estimation provided by the angle sensor 260.

In this fashion, the azimuth angle estimation unit 270 may use the angular rate sensed by the angular rate sensor 210 or the angle of rotation of the angular rate sensor 210 to compute an azimuth angle that the main body, the angular rate sensor 210 or the apparatus 200 faces. In some implementations, the angular rate sensor 210 may comprise multiple sensors. In this case, the azimuth angle estimation unit 270 may be configured to estimate an azimuth angle, which the main body or the angular rate sensor 210 faces, based on multiple angular rates sensed by the multiple sensors. In some implementations, the angular rate sensor 210 may average the multiple angular rates sensed by the multiple sensors. In some implementations, the azimuth angle estimation unit 270 may use a recursive filter estimation method (e.g., a Kalman filter or least squares (LS) estimation) based on the multiple angular rates sensed by the multiple sensors. In some implementations, the azimuth angle estimation unit 270 may estimate the azimuth angle based on an average of at least two angular rates sensed by a single angular rate sensor during a given time interval. In this case, the recursive estimation method (the Kalman filtering or LS estimation method) may also be used to estimate the azimuth angle. Each of the angular rate sensors may be configured to sense an angular rate about a different axis, i.e., a different axis component (an X-axis component, a Y-axis component or a Z-axis component) of the angular rate.

In estimating the azimuth angle, the azimuth angle estimation unit 270 may be further configured to estimate an azimuth angle, which the angular rate sensor 210 faces, based on at least one of an X-axis component and a Y-axis component of the sensed angular rate and the angle of rotation. That is, the azimuth angle estimation unit 270 may either use an X-axis component of the sensed angular rate and the angle of rotation or a Y-axis component of the sensed angular rate and the angle of rotation.

Furthermore, the azimuth angle estimation unit 270 may be configured to estimate the azimuth angle according to the latitude of the main body's location and the earth's rotation rate (earth rate). More detailed descriptions will later be provided in conjunction with FIGS. 3-6.

Also, the azimuth angle estimation unit 270 may be further configured to estimate the azimuth angle according to a difference between the angular rates sensed before and after the rotation. This is because the angular rate sensed by the angular rate sensor 210 includes an error. More detailed descriptions in this regard will be provided in conjunction with FIGS. 7 and 8. Meanwhile, the angular rate component sensed after the rotation may include an angular rate component sensed when the angular rate sensor 210 is in a stationary state or an angular rate component sensed while the angular rate sensor 210 is rotating.

Furthermore, the azimuth angle estimation unit 270 may be further configured to estimate the azimuth angle with reference to an angle the main body makes with the ground level. To this end, the apparatus for providing an azimuth angle 200 may comprise a means such as the tilt sensor 280 to measure the angle the main body makes with the ground level.

The control unit 240 may be communicated with the angular rate sensor 210, the driving unit 220, the memory 230, the input unit 250, the angle sensor 260, and the azimuth angle estimation unit 270 to supervise data transfer among them. The control unit 240 may be configured to provide control signals to the angular rate sensor 210, the driving unit 220, the memory 230, the input unit 250, the angle sensor 260, and the azimuth angle estimation unit 270.

Figure 3:
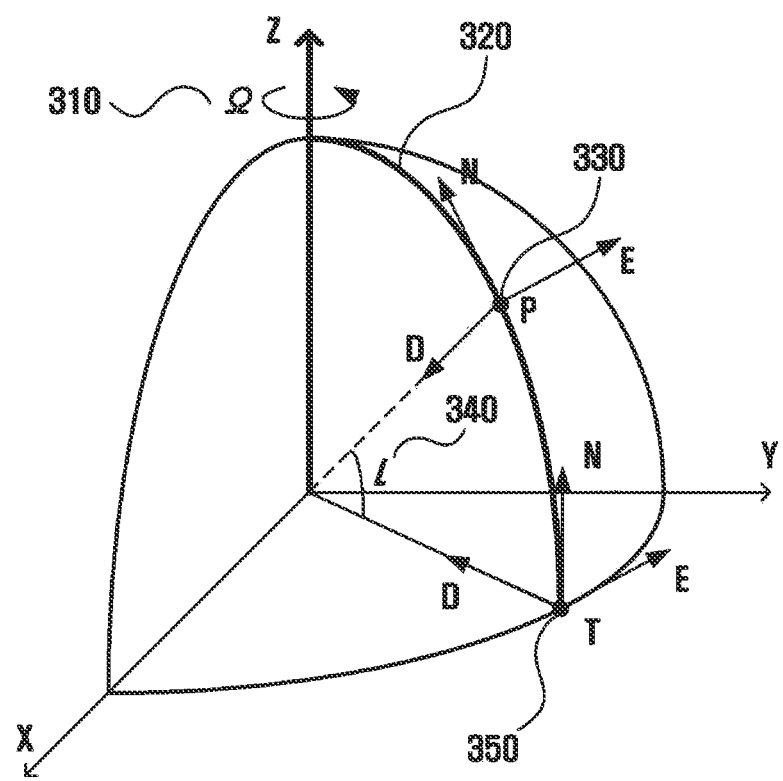
FIGS. 3 and 4 are views showing the relationships between an angler rate of the earth's rotation measured at the equator and an angler rate measured at a particular latitude.
Figure 4:
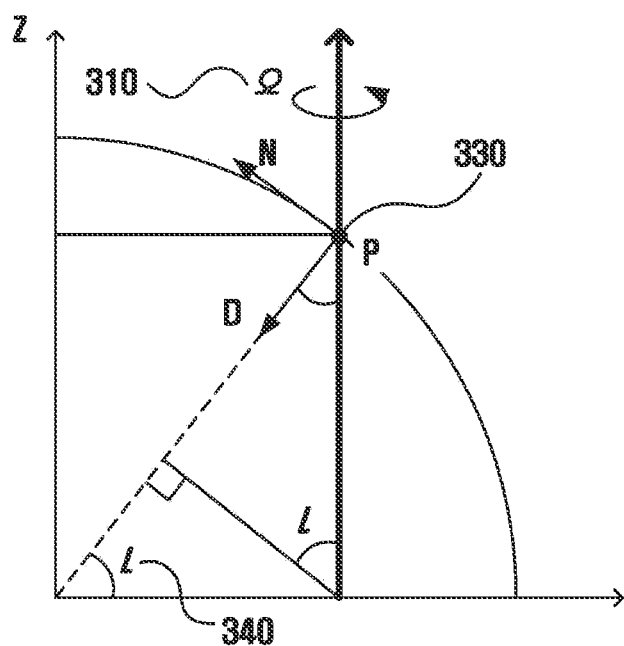
Figure 4:
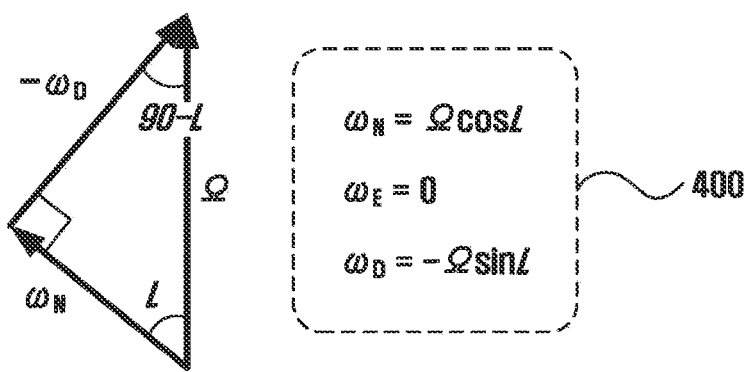

FIGS. 3 and 4 are views showing the relationships between an angler rate of the earth's rotation measured at the equator and an angler rate measured at a particular latitude. These figures illustrate an angular rate at the point (P) 330 located on the line of longitude 320 that connects the pole and the equator.

Generally, an angular rate may have 3-axis components in the 3-dimensional coordinate system. Thus, in FIG. 3, the point (T) 350 that is located on the equator and the line of longitude 320, three components of the angular rate exist, which includes an angular rate in the direction (N) that is parallel to the earth's axis of rotation (Z), an angular rate in the direction (E) that is perpendicular to the line of latitude including the point (T) 350, and an angular rate in the direction (D) that points towards the center of the earth.

However, at the point (T) 350, only the angular rate in the direction (N) is affected by the earth's rotation. On the other hand, the angular rates in the directions (E and D) are not affected by the earth's rotation, and their values are 0.

Therefore, at the point (T) 350, the angular rate in the direction (N) becomes the angular velocity of the earth's rotation ($\Omega$) 310.

Meanwhile, in order to measure an angular rate at the point (P) 330, which is located at the latitude (L) 340 on the line of longitude 320, the angular rate in the direction (N), the angular rate in the direction (E), and the angular rate in the direction (D) may be obtained. At the point (P) 330, the angular rates in the directions (N and D) are affected by the earth's rotation. Since the angular rate in the direction (E) is not affected by the earth's rotation at the point (P) 330, it becomes 0.

FIG. 4 shows a mathematical equation for an angular rate in the N direction ($\omega_N$), an angular rate in the E direction ($\omega_E$), and an angular rate in the D direction ($\omega_D$). Hereinafter, the equation is referred to as "an angular rate equation 400."

At the point (P) 330, the sensed angular rate consists of or includes a combination of the angular rate in the N direction and the angular rate in the D direction. Thus, the angular rate equation 400 is represented as shown in FIG. 4. The values for the angular rate in the N direction, the angular rate in the E direction, and the angular rate in the D direction are determined based on the angular velocity of the earth's rotation 310 and the latitude 340.

Figure 5:
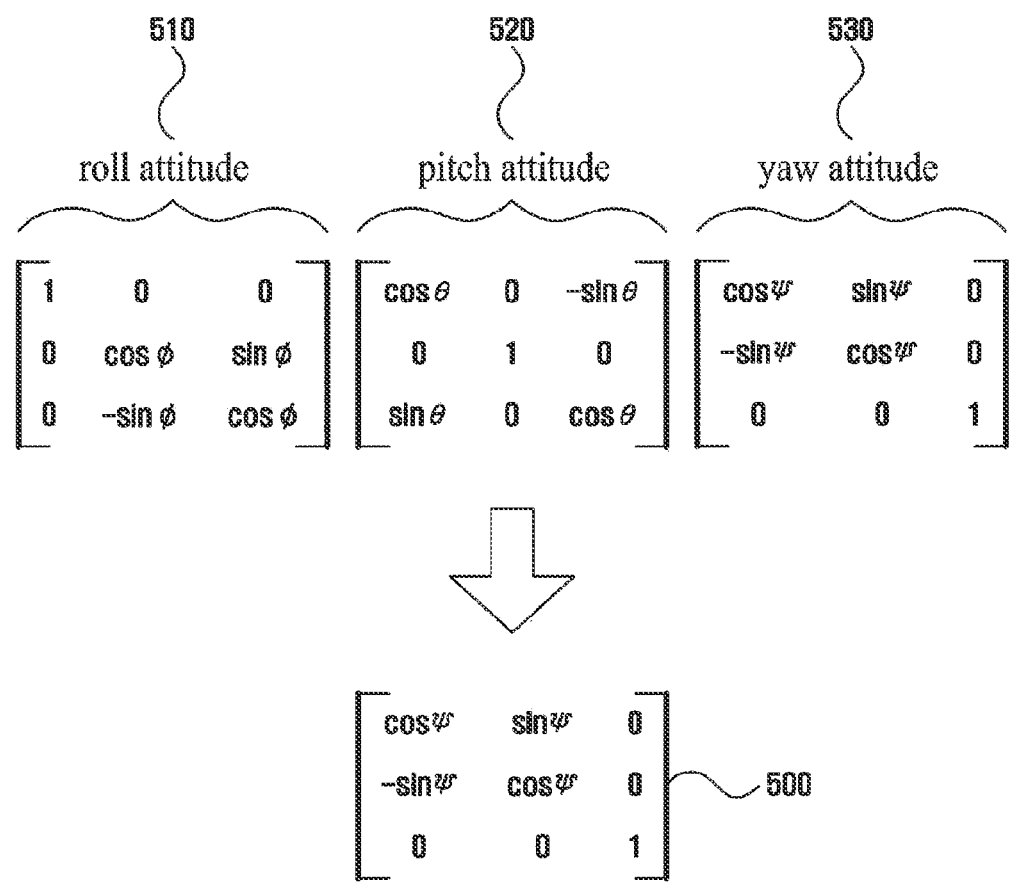
FIG. 5 is a view to explain the process of deriving an attitude of a rotating table according to one embodiment of the disclosed technology.

FIG. 5 is a view to explain the process of deriving an attitude of a rotating table according to one embodiment of the disclosed technology.

A position of an object may be defined on the basis of roll 510 whose reference axis is the direction of movement; pitch 520 whose reference axis is perpendicular to the direction of movement and is parallel to the earth's surface; and yaw 530 whose reference axis is perpendicular to the direction of movement and to the earth's surface.

In various embodiments of the disclosed technology, the rotating table 100 may rotate about a reference axis, which is in the direction perpendicular to the earth's surface or in the direction slightly tilted from the earth's surface. For ease of explanation, however, it is assumed that the rotating table 100 rotates about the reference axis that is in the direction perpendicular to the earth's surface. Thus, the attitude 500 of the rotating table 100 is only affected by yaw 530 and is not affected by roll 510 or pitch 520.

Since it has been assumed that the rotating table 100 is not rotating about the yaw axis or roll axis as above, the yaw and roll components are 0. Based on such assumption, the attitude 500 of the rotating table 100 can be derived.

When the derived attitude 500 of the rotating table 100 is applied to the angular rate equation 400 at the point (P) 330, which is obtained as explained in FIG. 4, the angular rate 600 may be estimated according to the attitude of the rotating table 100.

The sensed value 600 sensed by the angular rate sensor 210 according to the attitude of the rotating table 100 includes an X-axis angular rate component 610, a Y-axis angular rate component 620, and a Z-axis angular rate component 630. In estimating the azimuth angle, at least one of the X-axis angular rate component 610 and the Y-axis angular rate component 620 may be used.

In sum, based on the attitude of the rotating table 100, the angular rate sensor 210 may sense the angular rate, and by using the angular rate, it is possible to estimate the azimuth angle.

Figure 7:
FIG. 7 is a view illustrating an equation of an angular rate expressed in terms of an attitude of a rotating table according to the results shown in FIG. 6.

FIG. 7 illustrates an equation representing an X axis angular rate component as measured by the angular rate sensor 210 in a rotating table having an arbitrary azimuth angle obtained in FIG. 6.

In some implementations of the disclosed technology, the angular rate sensor 210 may be a low-price sensor of a low-sensitivity instead of a high-price sensor of a high-sensitivity. In this case, the angular rate sensor 210 of the disclosed technology may include some degree of error. Therefore, the equation 700 for the angular rate as provided in FIG. 7 reflects an error 710 in the output of the angular rate sensor 210.

In FIG. 7, $\omega x$ is known value measured by the angular rate sensor 210 and the angular velocity $\Omega$ of the earth's rotation and a latitude L are also known. However, the error 710 in the output of the angular rate sensor 210 and the azimuth angle $\Psi$ is unknown. Therefore, the error 710 and the azimuth angle $\Psi$ may be estimated using two different equations expressed in terms of different azimuth angles.

Figure 8:
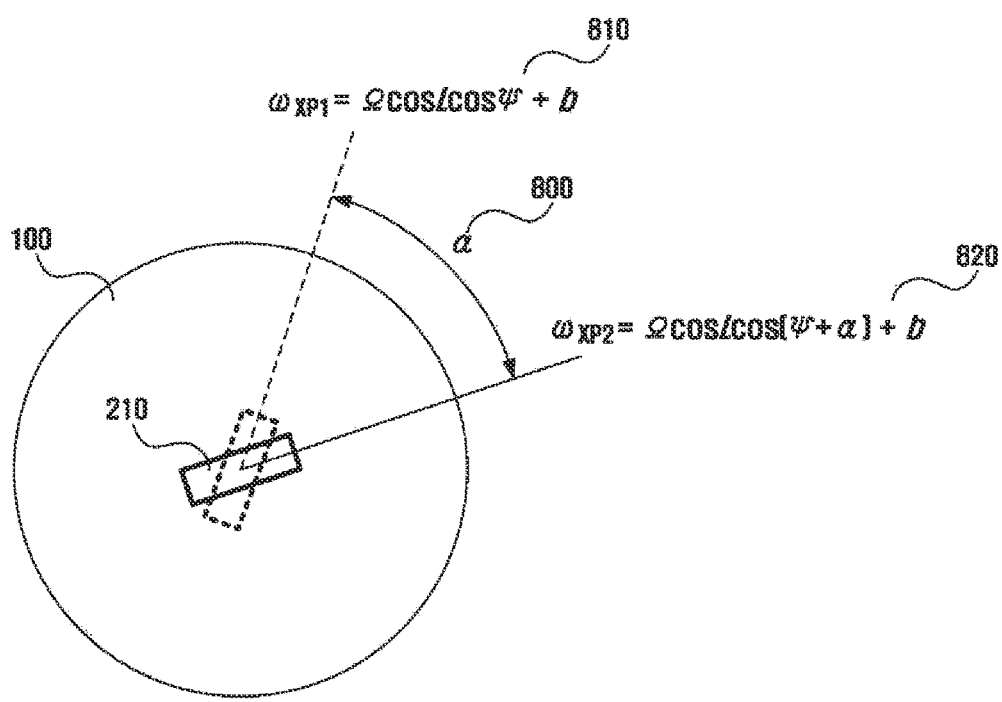
FIG. 8 is a view to illustrate estimating an azimuth angle using the angular rate equation shown in FIG. 7 according one embodiment of the disclosed technology.

Thus, as shown in FIG. 8, when the rotating table 100 is rotated by $\alpha$ degrees 800 to rotate the angular rate sensor 210, two different equations 810 and 820 may be obtained. The angular rate equation 810 before the rotation and the angular rate equation 820 after the rotation may be combined to compute both the error and the azimuth angle.

In other words, the azimuth angle estimation unit 270 may estimate the azimuth angle by using the equation 810 and the equation 820, wherein the equation 810 is expressed in terms of an angular rate sensed by the angular rate sensor 210, the angular velocity of earth's rotation, a latitude position of the main body, an azimuth angle in a state before the angular rate sensor 210 is firstly subject to rotation, and a first error in the output of the angular rate sensor 210, and the equation 820 is expressed in terms of the angular rate sensed by the angular rate sensor 210, the angular velocity of the earth's rotation, the latitude of the main body, an azimuth angle in a state after the angular rate sensor 210 is firstly subject to rotation, and the first error in the output of the angular rate sensor 210. In the equations 810 and 820, the azimuth angle in a state before the angular rate sensor 210 is firstly subject to rotation, the azimuth angle in a state after the angular rate sensor 210 is firstly subject to rotation, and the first error in the output of the angular rate sensor 210 are unknown values. Those unknown values can be ultimately found using two equations 810 and 820.

In various embodiments of the disclosed technology, it can be understood that the angular rate sensor 210 is in a stationary state prior to the rotation.

After the rotation, the angular rate sensor 210 may be in a stationary state or in rotating motion. For example, in FIG. 8, the angular rate equation 810 before the rotation may be applied when the angular rate sensor 210 is in a stationary state, while the angular rate equation 820 after the rotation may be applied not only in a stationary state after the completion of the rotation but also in a state when the angular rate sensor 210 is rotating.

If the angular rate equation 820 is applied for the case where the angular rate sensor 210 is rotating, an angular rate caused by the rotation of the angular rate sensor 210 as well as the angular velocity of the earth's rotation may be reflected in the equation 820.

In sum, the azimuth angle may be estimated using the angular rate equation 810, which applies before rotation, and multiple angular rate equations 820, which apply after multiple rotations. Therefore, it is possible to estimate an azimuth angle in real time while the angular rate sensor 210 is rotating.

Meanwhile, if the latitude is also unknown, the azimuth angle estimation unit 270 may estimate the azimuth angle by applying a third equation, which may be derived through the further rotation of the angular rate sensor 210, to the first and second equations. In other words, if the azimuth angle in a state before the angular rate sensor 210 is firstly subject to rotation, the latitude and the first error are unknown, the angular rate sensor 210 may be rotated twice to derive the first, second and third equations, through which the azimuth angle may be estimated.

The third equation may include terms: the angular rate sensed by the angular rate sensor 210, the angular velocity of the earth's rotation, the latitude of the main body, the azimuth angle in a state after the angular rate sensor 210 is secondly subject to rotation, and the first error in the output of the angular rate sensor 210.

Meanwhile, according to some implementations of the disclosed technology, a scale factor and/or drift bias may be included in the error component. For example, the error may include a first error, which is a scale factor, and a second error, which is a drift bias.

Therefore, if the error includes multiple different error components, the number of mathematical equations involved may vary depending on the number of error components. In other words, if the first error is a scale factor and the second error is a drift bias, rotating the angular rate sensor 210 three times enables to derive four mathematical equations, which allow an estimation of the azimuth angle.

FIGS. 7 and 8 are views illustrating a process of estimating an azimuth angle using the X-axis angular rate component. However, as noted above, the Y-axis angular rate component may also be used to estimate the azimuth angle. The process of estimating the azimuth angle using the Y-axis angular rate component is similar to the process using the X-axis angular rate component, and thus further explanations therefor are omitted herein.

In the case where both the X-axis and Y-axis angular rate components are used, the azimuth angle may be estimated based on an average of the sensed angular rates or the Kalman filtering technique, as described above.

While the descriptions provided thus far has been under the assumption that the rotating table 100 is rotating about an axis, which is in the perpendicular direction to the earth's surface, it should be appreciated that it is possible to estimate the azimuth angle in the case where the rotating table 100 is rotating about an axis that is at a tilted angle from the earth's surface.

An azimuth angle may be estimated if an angle the rotating table 100 makes with the earth's surface (i.e., a roll value 510 and a pitch value 520) is known.

Figures 9, 10:
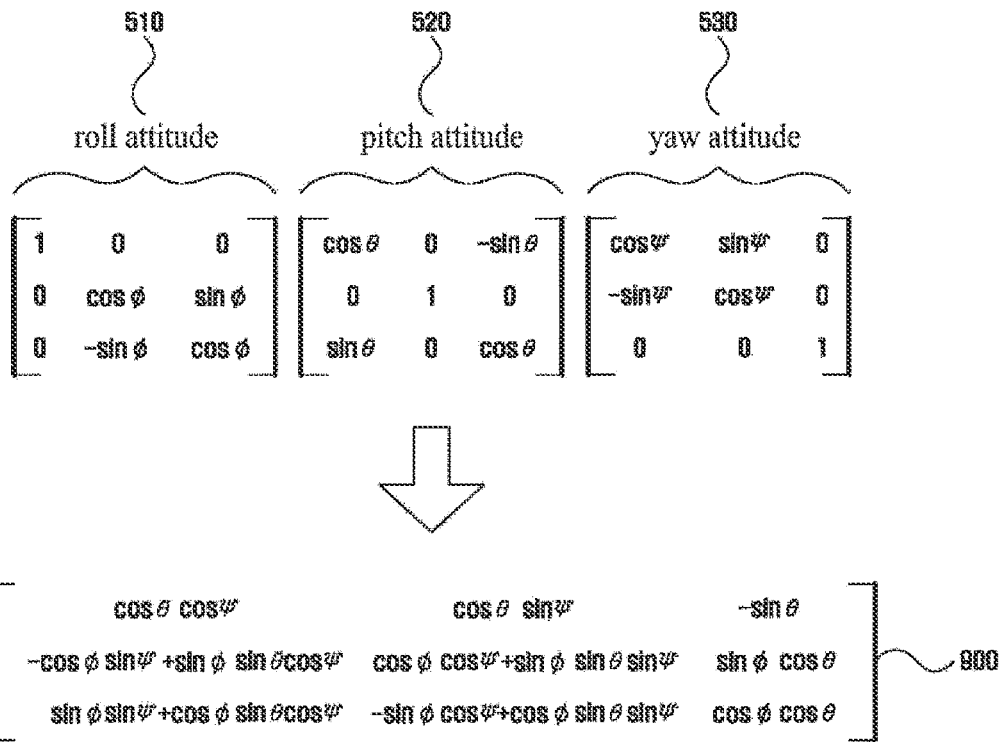
FIG. 9 is a view to explain deriving an attitude of a rotating table according to other embodiments of the disclosed technology.
FIG. 10 is a view showing a combination of an angular rate measured in a particular latitude shown in FIG. 4 and an attitude of a rotating table shown in FIG. 9.

FIG. 9 is a view to explain deriving an attitude of a rotating table according to other embodiments of the disclosed technology. FIG. 9 shows an attitude 900 in the case that not only a yaw value 530 but also a roll value 510 and a pitch value 520 are not 0.

Also, FIG. 10 is a view showing an angular rate measured according to the attitude in FIG. 9. As shown in FIG. 10, the value 1000 measured by the angular rate sensor 210 comprises an X-axis angular rate component 1010, a Y-axis angular rate component 1020, and a Z-axis angular rate component 1030. In estimating an azimuth angle, at least one of the X-axis angular rate component 1010 and the Y-axis angular rate component 1020 may be used.

As with the case where the rotating table 100 is perpendicular to the earth's surface, an angular rate may be sensed by the angular rate sensor 210 according to the attitude of the rotating table 100. By using the angular rate, the azimuth angle may be estimated. Descriptions in this regard have been provided above, and thus are omitted.

In the above, the embodiments have been explained through the detailed descriptions as provided above in conjunction with the drawings. However, those skilled in the relevant art will readily appreciate that the disclosed technology can be embodied into various forms.

What is claimed is:
1. An apparatus comprising:
a rotatable member;
a driver configured to cause a rotation of the rotatable member by a first angle;
an angular rate sensor engaged to the rotatable member and configured to sense an angular rate of the rotatable member, the angular rate sensor further configured to make measurements of the angular rate of the rotatable member to include a first angular rate of the rotatable member sensed before the rotatable member is rotated and a second angular rate of the rotatable member sensed after the rotatable member is rotated; and an azimuth angle estimation unit configured to receive information on the first and second angular rates of the rotatable member and estimate an azimuth angle of the rotatable member based on the first and second angular rates and the first angle.

2. The apparatus of claim 1, wherein the first angle is predetermined.

3. The apparatus of claim 1, wherein the first angle is arbitrary, and the apparatus further comprises an angle sensor configured to sense the first angle.

4. The apparatus of claim 1, wherein the azimuth angle estimation unit is further configured to estimate the azimuth angle of the rotatable member based on a difference between the first and second angular rates.

5. The apparatus of claim 1, wherein the angular rate sensor operates to measure the second angular rate when the angular rate sensor is stationary after the rotation or while the angular rate sensor is rotating.

6. The apparatus of claim 1, wherein the azimuth angle estimation unit is further configured to estimate the azimuth angle of the rotatable member based on an average of the first and second angular rates.

7. The apparatus of claim 1, wherein the angular rate sensor comprises at least two sensors, each sensing a different axis component of the angular rate of the rotatable member.

8. The apparatus of claim 1, wherein the azimuth angle estimation unit is further configured to estimate the azimuth angle of the rotatable member based on the first angle, the first and second angular rates, the angular velocity of the earth's rotation, and a latitude of the rotatable member.

9. The apparatus of claim 8, wherein the azimuth angle estimation unit is further configured to produce a recursive filter estimation of the azimuth angle of the rotatable member based on the first angle, the first and second angular rates, the angular velocity of the earth's rotation, and the latitude of the rotatable member.

10. The apparatus of claim 1, wherein the driver is further configured to cause an additional rotation of the rotatable member by a second angle; the angular rate sensor is configured and operated to make further measurements of the angular rate to include a third angular rate of the rotatable member sensed after the additional rotation of the rotatable member; and the azimuth angle estimation unit is further configured to estimate the azimuth angle of the rotatable member based on the first and second angles, the first, second, and third angular rates, and the angular velocity of the earth's rotation.

11. The apparatus of claim 10, wherein the azimuth angle estimation unit is further configured to produce a recursive filter estimation of the azimuth angle of the rotatable member based on the first and second angles, the first, second, and third angular rates, and the angular velocity of the earth's rotation.

12. An apparatus comprising:
a rotatable member;
a driver configured to cause a rotation of the rotatable member by a first angle;
an angular rate sensor engaged to the rotatable member and configured to sense an angular rate of the rotatable member; and
an azimuth angle estimation unit configured to receive information on the sensed angular rate of the rotatable member and estimate an azimuth angle of the rotatable member based on the sensed angular rate and the first angle wherein the azimuth angle estimation unit is further configured to estimate the azimuth angle of the rotatable member based on the first angle, wherein the azimuth angle estimation unit is further configured to estimate the azimuth angle of the rotatable member with reference to an attitude of the rotatable member.

13. An apparatus comprising:
an angular rate sensor;
a drive mechanism configured to rotate the angular rate sensor; and
an angle sensor configured to sense an angle by which angular rate sensor is rotated;
wherein the angular rate sensor is configured to sense an angular rate of the angular rate sensor rotated by the drive mechanism; and
an azimuth angle estimation unit configured to estimate an azimuth angle of the angular rate sensor based on the sensed angular rate from the angular rate sensor, an angle by which the angular rate sensor is rotated, and an angular velocity of the earth's rotation.

14. The apparatus of claim 13, wherein the drive mechanism comprises a rotatable member engaged to the angular rate sensor to cause the angular rate sensor to rotate together with the rotatable member.

* * * * *